(12) United States Patent
Bannon

(10) Patent No.: US 7,197,870 B2
(45) Date of Patent: Apr. 3, 2007

(54) PRESSURE/FLOW SENSING STALL RECOVERY FOR A RAM AIR TURBINE

(75) Inventor: David G. Bannon, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 341 days.

(21) Appl. No.: 10/965,455

(22) Filed: Oct. 14, 2004

(65) Prior Publication Data

US 2006/0083633 A1    Apr. 20, 2006

(51) Int. Cl.
*F15B 21/02* (2006.01)
(52) U.S. Cl. .......................... 60/413; 60/468
(58) Field of Classification Search .............. 60/413, 60/444, 468; 91/5, 47; 416/43
See application file for complete search history.

(56) References Cited

U.S. PATENT DOCUMENTS

| | | | |
|---|---|---|---|
| 2,711,071 A | 6/1955 | Frankel | |
| 2,848,873 A * | 8/1958 | Levetus et al. | 91/5 |
| 3,125,960 A * | 3/1964 | Chilman | 416/36 |
| 3,393,509 A * | 7/1968 | Kempson | 60/413 |
| 3,800,534 A | 4/1974 | Kacek | |
| 4,118,926 A | 10/1978 | Curvino et al. | |
| 4,245,462 A | 1/1981 | McCombs, Jr. | |
| 4,509,325 A | 4/1985 | Morgan et al. | |
| 4,581,888 A | 4/1986 | Schmitzer et al. | |
| 4,622,808 A | 11/1986 | Kenison et al. | |
| 4,627,234 A | 12/1986 | Schuh | |
| 4,684,081 A | 8/1987 | Cronin | |
| 4,912,921 A | 4/1990 | Rice et al. | |
| 5,051,918 A | 9/1991 | Parsons | |
| 5,122,036 A * | 6/1992 | Dickes et al. | 416/157 R |
| 5,442,907 A | 8/1995 | Asquith et al. | |
| 5,735,116 A | 4/1998 | Mouton | |
| 5,845,483 A | 12/1998 | Petrowicz | |
| 6,145,308 A * | 11/2000 | Bueche et al. | 60/398 |

FOREIGN PATENT DOCUMENTS

| | | |
|---|---|---|
| JP | 359018240 A | 1/1984 |
| JP | 359018241 A | 1/1984 |

* cited by examiner

*Primary Examiner*—Igor Kershteyn
(74) *Attorney, Agent, or Firm*—Stephen G. Mican

(57) ABSTRACT

A stall recovery system for a ram air turbine (RAT) that supplements the operation of a volume fuse in the hydraulic system of the RAT by sensing a stall condition as the combination of low pressure at less than maximum flow and reducing RAT load torque after the sensed stall so that stall recovery is possible.

18 Claims, 1 Drawing Sheet

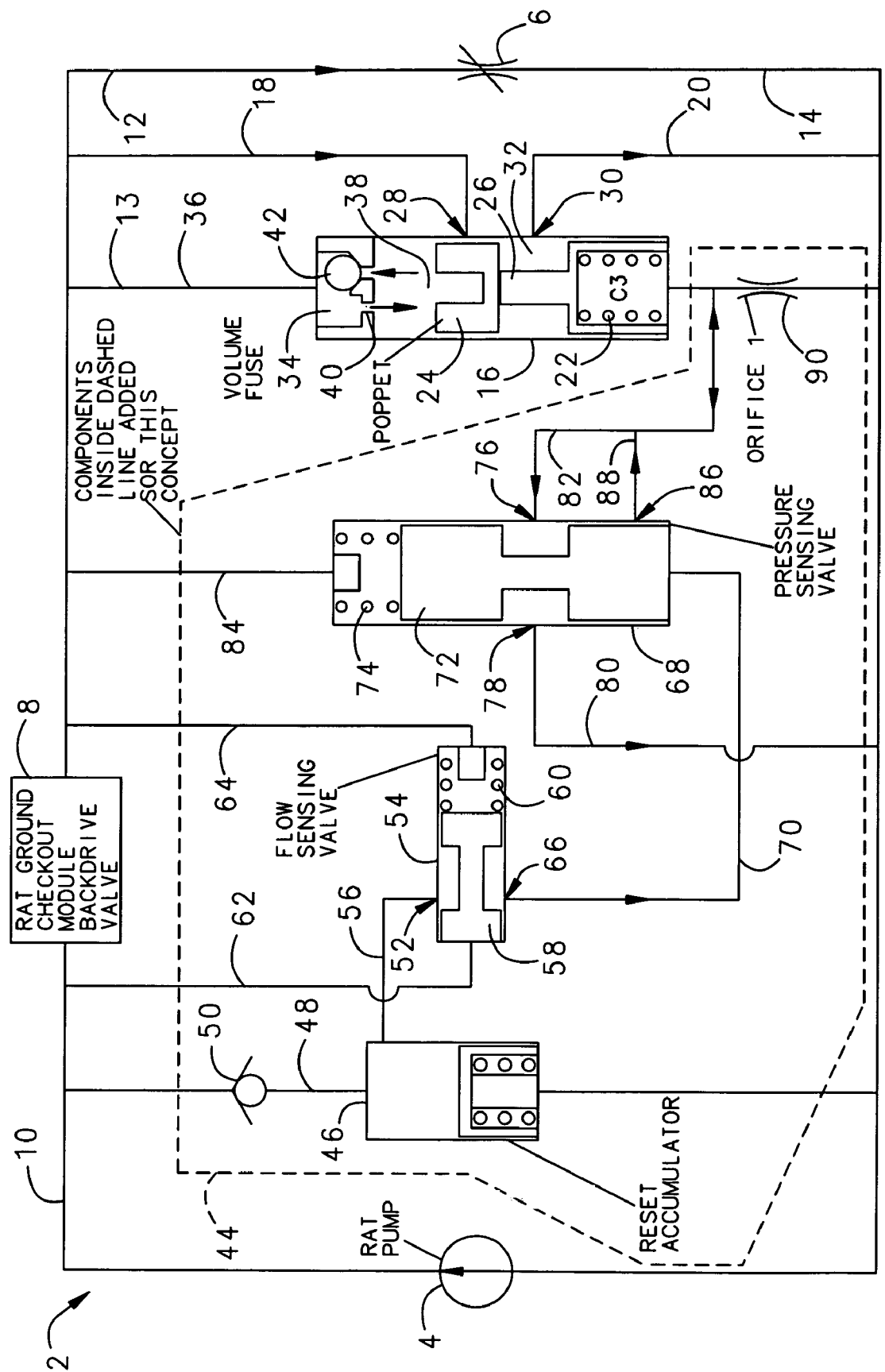

PRESSURE/FLOW SENSING STALL RECOVERY FOR A RAM AIR TURBINE

FIELD OF THE INVENTION

The invention relates to emergency supplemental power supplies for aeronautical applications, and more particularly to an improved ram air turbine for generating emergency supplemental power for aircraft in flight.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. The turbine is coupled to suitable power generating equipment, such as a hydraulic pump for hydraulic power and an electric generator for electric power.

The placement of a RAT on some aircraft is such that the aircraft landing gear deployment causes the landing gear to pass in front of the RAT, thereby blocking incoming airflow to the RAT. The reduction in airflow causes the RAT to stall. When the RAT stalls, it continues to rotate at a low speed, typically approximately 800 rpm, such that equilibrium exists between the turbine torque and the load torque.

Once the stall occurs, the RAT may not start back up, even when the landing gear completes its deployment and it no longer blocks the airflow to the RAT. A further reduction in the load torque is required for the RAT to re-start. The RAT then accelerates back up to full speed.

The current method of reducing load torque during initial start-up for a RAT of the hydraulic type comprises bypassing the aircraft hydraulic load until the RAT reaches full speed up. A "volume fuse" bypasses the aircraft load for this purpose. Unfortunately, this method of reducing load torque is only satisfactory during start-up, when the RAT speed is approximately zero rpm. This method does not reduce load torque for stall recovery when the RAT has stalled to a speed of around 800 rpm because the volume fuse does not reset.

SUMMARY OF THE INVENTION

The invention comprises a stall recovery system for a ram air turbine (RAT) that supplements the operation of a volume fuse in the hydraulic system of the RAT by sensing a stall condition as the combination of low pressure at less than maximum flow and reducing RAT load torque after the sensed stall so that stall recovery is possible. Hydraulic fluid in a reset accumulator flows through a flow sensing valve and a pressure sensing valve to a port of the volume fuse to reset the volume fuse when a sudden loss of pressure at less than maximum flow due to stall occurs.

In a preferred embodiment, the invention comprises an improved ram air turbine that has a hydraulic pump and a volume fuse for bypassing a load coupled to the pump during start-up and that has stall sensing and recovery capability, comprising: an accumulator for storing hydraulic fluid pumped by the hydraulic pump; a flow-sensing valve for passing fluid from the accumulator only when the flow through the load is less than a maximum rate; and a pressure-sensing valve for passing fluid from the flow-sensing valve to the volume fuse only when load pressure falls to a level that indicates a possible stall to reset the volume fuse to a bypass condition.

For a ram air turbine (RAT) that has a hydraulic pump for supplying a hydraulic load and a volume fuse for bypassing the load during start-up, the invention also comprises a stall recovery system for the RAT comprising: an accumulator for storing hydraulic fluid pumped by the hydraulic pump; a flow-sensing valve for passing fluid from the accumulator only when the flow through the load is less than a maximum rate; and a pressure-sensing valve for passing fluid from the flow-sensing valve to the volume fuse only when load pressure falls to a level that indicates a possible stall to reset the volume fuse to a bypass condition.

DESCRIPTION OF THE DRAWINGS

FIG. 1 shows a schematic of a RAT hydraulic system that has a stall recovery feature according to the invention.

DETAILED DESCRIPTION OF THE INVENTION

FIG. 1 shows a schematic of a RAT hydraulic system 2 that has a stall recovery feature according to the invention. The hydraulic system 2 has a hydraulic pump 4 that couples hydraulic fluid to an aircraft hydraulic load 6 through a fixed flow restriction 8 by way of lines 10 and 12 for preventing the pump 4 when the pump 4 from reversing when it loses pressure. Hydraulic fluid discharged by the load 6 returns to the pump 4 by way of line 14.

The hydraulic system 2 uses a volume fuse 16 to bypass the load 6 by way of line 18 coupled to the line 12 and line 20 coupled to the line 14 during start-up of the system 2. When the RAT is at standstill, force of a bias spring 22 holds a poppet 24 and a piston 26 at toward a first end of the volume fuse 16. In this position, a volume fuse inlet port 28 coupled to line 12 by is open and a volume fuse outlet port 30 line 20 is closed.

When the RAT starts, hydraulic fluid enters a central chamber 32 of the volume fuse 16 through the inlet port 28. Pressure of the fluid in the chamber 32 on the piston 26 creates a force that exceeds the force of the bias spring 22 to force the piston 26 to a second end of the volume fuse 16, allowing the fluid to pass through the chamber 32 out of the outlet port 30 to line 14 by way of line 20 and thereby bypass the load 6 during start-up. This bypass action causes a reduction in load torque for the RAT suitable for start-up without stalling. The RAT is then able to accelerate toward its normal operating speed.

As the RAT speeds up, the flow through the chamber 32 causes a drop in pressure through line 18 and chamber 32 relative to the pressure in line 12 and first end chamber 34 of the volume fuse 16 coupled to line 12 by way of line 36. The chamber 34 connects to a poppet chamber 38 by way of an orifice 40. As a result, force developed by the difference in pressure across the poppet 24 allows fluid to flow through the orifice 40. The fluid flow causes the poppet 24 to travel towards the piston 26 away from the first end of the volume fuse 16. The orifice 40 determines the rate of travel of the poppet 24. As the poppet 24 moves toward the second end of the volume fuse 16, it cuts off the inlet port 28, thereby ceasing bypass action and letting the RAT operate in its normal mode of operation.

The normal mode of operation continues as long as sufficient pressure remains on line 12 so that the force developed on the poppet 24 in the chamber 38 exceeds the force of the bias spring 22. However, if the RAT stops operating the pressure in chamber 34 also suddenly drops. The force of the bias spring 22 then drives the fluid in the chamber 38 back into the chamber 34 by way of a check valve 42 and both the poppet 24 and the piston 26 return to their rest position near the first end of the volume fuse 16, thereby re-opening the inlet port 28 and returning the system 2 to the starting mode.

The portion of the system 2 described so far relates to prior art technology. During a stall condition, the pressure in line 12 does not drop low enough for the pressure in chamber 38 to let the bias spring 22 reset the volume fuse. Consequently, an additional stall recovery system 44, indicated by dashed line in FIG. 1, provides the necessary function to reset the volume fuse 16 upon the occurrence of a stall condition.

The stall recovery system 44 has a reset accumulator 46 couples to line 10 by way of a line 48 and check valve 50 to prevent back flow of hydraulic fluid stored in the accumulator 46. The accumulator 46 stores fluid for resetting the volume fuse 16 during a stall condition. The accumulator 46 also couples to an inlet 52 of a flow-sensing valve 54 by way of line 56. The flow-sensing valve 54 has a spool 58 displaced by a bias spring 60 to a normally open position. Differential pressure across lines 62, 64 between the fixed flow restriction 8 and the flow sensing valve 54 permit the spool 58 to overcome the force of the bias spring 60 and move the spool 58 to a closed position when the differential pressure corresponds to maximum flow rate of the RAT. At any lesser flow rate, the flow-sensing valve 54 remains open.

Fluid passing through and outlet 66 of the flow sensing valve 54 couples to a first end of a pressure sensing valve 68 by way of a line 70. The pressure-sensing valve 68 has a spool 72 that is biased by a bias spring 74 to a position that opens a first port 76 to be in communication with an outlet port 78 that couples to line 14 by way of line 80. The first port 76 also couples to the second end of the volume fuse 16 by way of line 82. The second end of the pressure-sensing valve 68 also couples to line 12 by way of line 84. As long as the bias spring 74 force combined with force due to pressure of fluid on line 84 entering the second end of the pressure-sensing valve 68 exceeds the force due to pressure of fluid on line 70 entering the first end of the pressure-sensing valve 68, the position of the spool 72 remains in the biased position.

However, when pressure on line 12 drops at less than maximum flow due to a stall condition, the spool 72 shifts to block the first port 76 and opens a second port 86 that communicates with fluid entering the first end of the pressure-sensing valve 68 by way of line 70. The second port 86 couples to line 82 by way of line 88. The second end of the volume fuse also connects to line 14 through an orifice 90. When the second port 86 opens to allow fluid to flow from the accumulator 46 on line 70 to the second end of the volume fuse 16, the resulting force on the piston 26 forces the piston 26 and poppet 24 in the volume fuse 16 toward the first end of the volume fuse 16 to the starting mode. The excess pressure in the accumulator 46 bleeds from the second end of the volume fuse 16 to line 14 through the orifice 90. With the volume fuse 16 back in the starting position the RAT can accelerate back to operating speed.

As described above, the stall recovery system 44 only operates to reset the volume fuse 16 at a combination of low flow and low pressure that indicates the presence of a stall condition. Other conditions, such as very high load where there is low pressure but high flow, do not trigger reset due to the operation of the flow-sensing valve 54. Likewise, high pressure, low flow conditions due not trigger reset due to the operation of the pressure-sensing valve 68. Generally speaking, a combination of flow less than maximum pump flow combined with a low pressure, usually less than approximately 1000 PSI, is sufficient for the stall recovery system 44 to identify a stall and reset the volume fuse 16.

Described above is a stall recovery system for a ram air turbine (RAT) that supplements the operation of a volume fuse in the hydraulic system of the RAT by sensing a stall condition as the combination of low pressure at less than maximum flow and reducing RAT load torque after the sensed stall so that stall recovery is possible. It should be understood that this embodiment is only an illustrative implementation of the invention, that the various parts and arrangement thereof may be changed or substituted, and that the invention is only limited by the scope of the attached claims.

What is claimed is:

1. An improved ram air turbine (RAT) that has a hydraulic pump and a volume fuse for bypassing a load coupled to the pump during start-up and that has stall sensing and recovery capability, comprising:
   an accumulator for storing hydraulic fluid pumped by the hydraulic pump;
   a flow-sensing valve for passing fluid from the accumulator only when the flow through the load is less than a maximum rate; and
   a pressure-sensing valve for passing fluid from the flow-sensing valve to the volume fuse only when load pressure falls to a level that indicates a possible stall to reset the volume fuse to a bypass condition.

2. The improved RAT of claim 1, wherein the flow-sensing valve senses differential pressure across a fixed flow restriction between the pump and the load.

3. The improved RAT of claim 1, wherein the pressure-sensing valve senses pressure downstream of a fixed flow restriction between the pump and the load.

4. The improved RAT of claim 1, wherein hydraulic fluid from the accumulator only resets the volume fuse when load pressure drops to a level that indicates a possible stall and flow through the load is less than the maximum rate that the pump can provide.

5. The improved RAT of claim 1, further comprising an orifice coupled to the volume fuse for bleeding hydraulic fluid passed to the volume fuse from the pressure-sensing valve.

6. The improved RAT of claim 1, further comprising a check valve coupled between the pump and the accumulator to prevent back flow of hydraulic fluid stored in the accumulator.

7. An improved ram air turbine (RAT) that has a hydraulic pump and a volume fuse for bypassing a load coupled to the pump during start-up and that has stall sensing and recovery capability, comprising:
   an accumulator for storing hydraulic fluid pumped by the hydraulic pump;
   a flow-sensing valve that senses differential pressure across a fixed flow restriction between the pump and the load for passing fluid from the accumulator only when the flow through the load is less than a maximum rate that the pump can provide; and
   a pressure-sensing valve that senses pressure downstream of a fixed flow restriction between the pump and the load for passing fluid from the flow-sensing valve to the volume fuse only when load pressure falls to a level that indicates a possible stall to reset the volume fuse to a bypass condition.

8. The improved RAT of claim 7, further comprising an orifice coupled to the volume fuse for bleeding hydraulic fluid passed to the volume fuse from the pressure-sensing valve.

9. The improved RAT of claim 7, further comprising a check valve coupled between the pump and the accumulator to prevent back flow of hydraulic fluid stored in the accumulator.

10. For a ram air turbine (RAT) that has a hydraulic pump for supplying a hydraulic load and a volume fuse for bypassing the load during start-up, a stall recovery system comprising:

an accumulator for storing hydraulic fluid pumped by the hydraulic pump;

a flow-sensing valve for passing fluid from the accumulator only when the flow through the load is less than a maximum rate; and a pressure-sensing valve for passing fluid from the flow-sensing valve to the volume fuse only when load pressure falls to a level that indicates a possible stall to reset the volume fuse to a bypass condition.

11. The improved RAT of claim 10, wherein the flow-sensing valve senses differential pressure across a fixed flow restriction between the pump and the load.

12. The improved RAT of claim 10, wherein the pressure-sensing valve senses pressure downstream of a fixed flow restriction between the pump and the load.

13. The improved RAT of claim 10, wherein hydraulic fluid from the accumulator only resets the volume fuse when load pressure drops to a level that indicates a possible stall and flow through the load is less than the maximum rate that the pump can provide.

14. The improved RAT of claim 10, further comprising an orifice coupled to the volume fuse for bleeding hydraulic fluid passed to the volume fuse from the pressure-sensing valve.

15. The improved RAT of claim 10, further comprising a check valve coupled between the pump and the accumulator to prevent back flow of hydraulic fluid stored in the accumulator.

16. For a ram air turbine (RAT) that has a hydraulic pump for supplying a hydraulic load and a volume fuse for bypassing the load during start-up, a stall recovery system comprising:

an accumulator for storing hydraulic fluid pumped by the hydraulic pump;

a flow-sensing valve that senses differential pressure across a fixed flow restriction between the pump and the load for passing fluid from the accumulator only when the flow through the load is less than a maximum rate that the pump can provide; and a pressure-sensing valve that senses pressure downstream of a fixed flow restriction between the pump and the load for passing fluid from the flow-sensing valve to the volume fuse only when load pressure falls to a level that indicates a possible stall to reset the volume fuse to a bypass condition.

17. The improved RAT of claim 16, further comprising an orifice coupled to the volume fuse for bleeding hydraulic fluid passed to the volume fuse from the pressure-sensing valve.

18. The improved RAT of claim 16, further comprising a check valve coupled between the pump and the accumulator to prevent back flow of hydraulic fluid stored in the accumulator.

* * * * *